(No Model.)
D. CIANI.
MEANS FOR PRESERVING WINES IN CASKS.
No. 597,955. Patented Jan. 25, 1898.
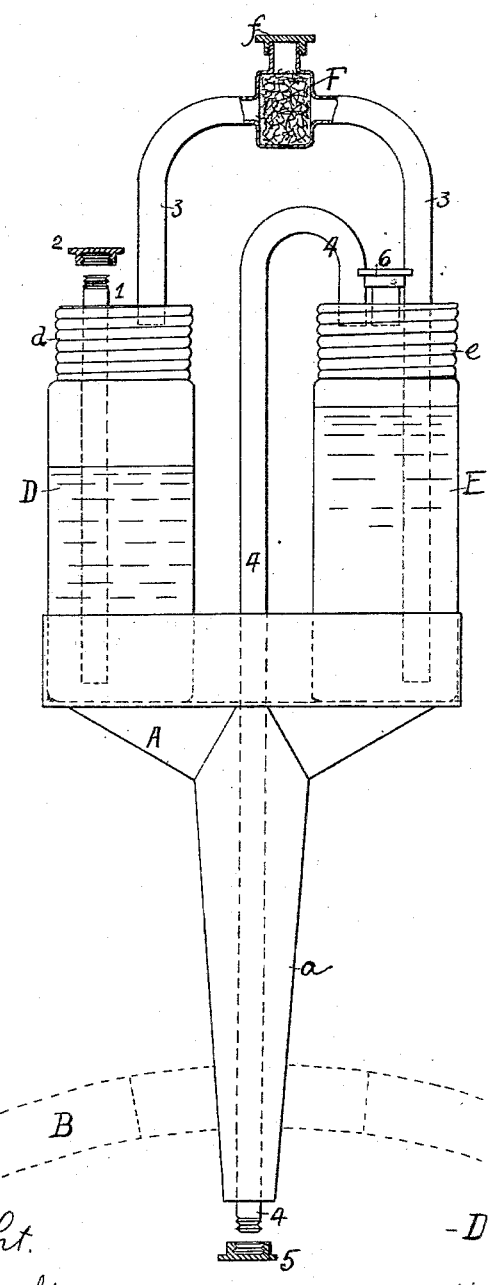
WITNESSES:
F.W. Wright.
E. J. Griswold
INVENTOR
— DINO CIANI —
BY
Howson and Howson
HIS ATTORNEYS.

UNITED STATES PATENT OFFICE.

DINO CIANI, OF NEW YORK, N. Y.

MEANS FOR PRESERVING WINES IN CASKS.

SPECIFICATION forming part of Letters Patent No. 597,955, dated January 25, 1898.

Application filed January 21, 1897. Serial No. 620,093. (No model.)

*To all whom it may concern:*

Be it known that I, DINO CIANI, a subject of the King of Italy, and a resident of New York city, New York, have invented an Improved Means for Preserving Wines in Casks as the Wine is Drawn Off, of which the following is a specification.

My invention consists of certain improvements whereby wines, liquors, and such liquids can be drawn from casks, barrels, &c., as required without risk of causing deterioration of the contents of the barrel by the air which has to be admitted to take the place of the liquid drawn off.

The figure in the accompanying drawing is a view, partly in section, illustrating my improved apparatus for the purpose.

This apparatus or device is intended to be applied to the upper part of the barrel or cask from which the wines are drawn. The frame A is shown as of sheet metal and has a tapering stem $a$, which is to serve as a bung by being introduced and closely fitted into an opening in the top of the barrel B, (indicated by dotted lines.) This frame A carries two vessels or bottles D and E, which may conveniently be made of glass and provided with screw caps or covers $d$ and $e$. The cover of the bottle D carries an inlet-pipe 1, which may have a suitable screw-cap 2 on the outside and which extends to near the bottom of the vessel D. From the upper part of this vessel—say through the cover—extends a pipe 3, whose opposite end passes through the cover of the second vessel E nearly to the bottom of that vessel. This pipe 3 3 is interrupted by a suitable chamber F, which may be provided with a suitable screw-cap $f$ at the top.

From the upper part of the vessel E—say through the cover $e$—extends a pipe 4, which passes down through the hollow tapering stem $a$ of the frame to a point preferably below the lower end of the latter. The lower end of this pipe 4 may be closed by a cap 5 when the device is not in use. The screw-cover $e$ of the vessel E may be provided with a capped inlet 6 for the introduction of liquid into the vessel E when desired.

In the vessel D, I provide means for the generation of a sulfurous anhydrid gas. In the second vessel F is provided an antiseptic, and in the third vessel I provide a composition adapted to preserve the wine and give it any desired flavor or bouquet.

In practice I prefer to provide in the first vessel acidulated water (water acidulated with tartaric acid, for example) and sulfite of calcium, ($CaSO_3$). In the chamber F, I prefer to provide cotton or other absorbent soaked or impregnated with salicylic acid. In the vessel E, I prefer to provide alcohol with any flavor which may be desired for the wine.

With the device or apparatus thus equipped and applied to the top of the barrel from which the wine is to be drawn (as in filling bottles from time to time) the cap 5 is of course removed, the caps $f$ and 6 are closed, and the cap 2 is removed. As the wine is drawn from the cask or barrel the air is drawn in through the inlet-tube 1 by the suction of the wine drawn off and is caused to bubble up through and agitate the liquid contents of the vessel D. The air thus admitted through the apparatus will be thoroughly sterilized by the action of the sulfurous acid generated and with which the air comes in contact on its way to the cask. The agitation of the liquid contents caused by the admission of the air drawn through the liquid on its way to the cask as the wine is drawn from the latter will stir up the liquid contents of the vessel D and tend to remove the coating of insoluble calcium tartrate formed on the sulfite and expose to the action of the tartaric acid particles of the sulfite of lime not previously acted upon, thus causing further development of sulfurous acid each time the air is admitted. From the vessel D the air passes on through the pipe 3, vessel F, and bottle E into the barrel or cask. By leaving empty the vessels F and E this may go direct to the cask to do its preserving work, but I may use also the salicylic acid in the vessel F and in some cases also the flavoring material in the bottle E. The wine in the barrel or cask is thus preserved and kept free from the purifying or injurious action of micro-organisms which would otherwise be drawn in with the air, and by the action of the contents of the vessel E a good flavor can be given to the wine, if needed.

By the term "wine" in this specification

I wish to include any liquor and other liquid which needs to be preserved or treated in the manner described.

I am aware that it has heretofore been proposed to provide means for preserving wines in casks by causing the entering air to pass through compositions. This I do not claim.

I claim as my invention—

The herein-described apparatus for preserving wines, consisting of a frame having a hollow stem forming a bung adapted to be inserted through a hole in a cask, and two vessels mounted on said frame, an air-inlet pipe to the bottom of the first vessel, a pipe extending from the top of the latter to the bottom of the second vessel and interrupted by a chamber adapted to contain an absorbent body, and an outlet-pipe extending from the upper part of the second vessel through the bung to a point near or below the end of said bung, substantially as specified.

In testimony whereof I have signed my name to this specification in the presence of two subscribing witnesses.

DINO CIANI.

Witnesses:
EDITH J. GRISWOLD,
HUBERT HOWSON.